(12) United States Patent
Liang

(10) Patent No.: US 8,267,658 B1
(45) Date of Patent: Sep. 18, 2012

(54) LOW COOLING FLOW TURBINE ROTOR BLADE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 587 days.

(21) Appl. No.: 12/419,584

(22) Filed: Apr. 7, 2009

(51) Int. Cl.
*F01D 5/08* (2006.01)
*F01D 5/20* (2006.01)

(52) U.S. Cl. ...................................................... 416/97 R
(58) Field of Classification Search .......................... None
See application file for complete search history.

(56) References Cited

U.S. PATENT DOCUMENTS

| 4,767,268 A * | 8/1988 | Auxier et al. ............... 416/97 R |
| 7,645,122 B1 * | 1/2010 | Liang ............................ 416/97 R |
| 2006/0051208 A1 * | 3/2006 | Lee et al. ...................... 416/97 R |

* cited by examiner

*Primary Examiner* — Fernando L Toledo
*Assistant Examiner* — Valerie N Brown
(74) *Attorney, Agent, or Firm* — John Ryznic

(57) ABSTRACT

A turbine rotor blade with low cooling flow includes a first forward flowing 5-pass serpentine flow cooling circuit that provides cooling air to a trailing edge row of exit holes and a second forward flowing 3-pass serpentine flow cooling circuit that provides cooling air to a leading edge showerhead arrangement of film cooling holes and to a blade tip cooling channel. The blade tip cooling channel includes a film cooling holes for the blade tip. The low flow cooing circuit provides for cooling of the blade without the need for impingement cooling of the leading edge and trailing edge regions.

14 Claims, 3 Drawing Sheets

LOW COOLING FLOW TURBINE ROTOR BLADE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to an industrial gas turbine engine, and more specifically to a low cooling flow rotor blade for an industrial gas turbine engine.

2. Description of the Related Art Including Information Disclosed Under 37 CFR 1.97 and 1.98

A gas turbine engine, such as an industrial gas turbine (IGT) engine, includes a turbine section with multiple rows or stages of rotor blades that react with a high temperature gas flow to convert the energy of the gas flow into mechanical energy that is used to drive the engine and power an aircraft in the case of an aero engine or drive an electric generator in the case of an IGT engine. The engine efficiency can be increased by passing a higher temperature gas flow into the turbine. However, the turbine inlet temperature is limited by the material properties of the turbine parts, especially the first stage stator vanes and rotor blades, and to the amount of cooling that these parts can be provided with.

In future engines, higher turbine inlet temperatures will require improved materials and better cooling designs. Improvements in the cooling capabilities of the airfoils (vanes and blades) will also contribute to improved engine efficiencies. Since the pressurized cooling air used to cool the airfoils is typically bled off from the compressor, the work performed to pressurize the cooling air is lost in the engine since the cooling air does no work on the engine. Low cooling flow vanes and blades are thus desired in order to provide improved efficiencies.

FIG. 1 shows an external heat transfer coefficient profile for a prior art first stage turbine rotor blade. As indicated by the figure, a suction side immediately downstream of the leading edge, as well as a pressure side trailing edge region of the airfoil, is exposed to higher hot gas side external heat transfer coefficient than the mid-chord section of the pressure side and downstream of the suction side surfaces. The graph shows (point A) a high Q on the suction side, a high heat load on the aft section of the pressure side surface (point C), and a high heat load region for the blade leading edge (point B) on this graph. In general, the heat load for the airfoil aft section is higher than in the forward section.

As the TBC technology improves and more IGT turbine blades are applied with a thicker or low conductivity TBC, the cooling air flow demand is gradually being reduced. As a result, there is not sufficient cooling flow for the design to split the total cooling flow into three flow circuits that utilize the forward flowing serpentine cooling design. Cooling flow for the blade leading edge and trailing edge has to be combined with a mid-chord flow circuit to form a single 5-pass flow circuit. However, for the forward 5-pass flow circuit with total blade cooling flow BFM (back flow margin) may become a design issue. In addition, a single 5-pass aft flowing serpentine for a large chord blade design may yield too high of a cooling air temperature when the cooling air reaches the end of the serpentine cooling flow channel. This results in a loss of cooling potential for the cooling air to achieve a designed low metal temperature. A low metal temperature for an airfoil is desired in order to increase the part life and to minimize erosion of the part.

BRIEF SUMMARY OF THE INVENTION

It is an object of the present invention to provide for a turbine rotor blade with a serpentine flow cooling circuit that can be used with a high pull stress turbine blade cooling design.

It is another object of the present invention to provide for a low cooling flow serpentine flow cooling circuit that can be used in a turbine rotor blade.

It is another object of the present invention to provide for a low cooling flow serpentine flow cooling circuit that can be used in a large chord turbine rotor blade.

It is another object of the present invention to provide for a rotor blade with a low cooling flow serpentine flow cooling circuit that does not require impingement cooling of the leading edge and the trailing edge.

The above objectives and more are achieved in the turbine rotor blade serpentine flow cooling circuit of the present invention that includes a 5-pass forward flowing serpentine flow cooling circuit in parallel with a 3-pass forward flowing serpentine flow cooling circuit to provide cooling for the entire blade. The 5-pass serpentine flows from the trailing edge region and provides for impingement cooling of the trailing edge region. The 3-pass serpentine flows from a mid-chord region and provides impingement cooling along the leading edge of the blade before flowing along the blade tip to provide cooling for the tip of the blade.

DETAILED DESCRIPTION OF THE INVENTION

Figure 1:
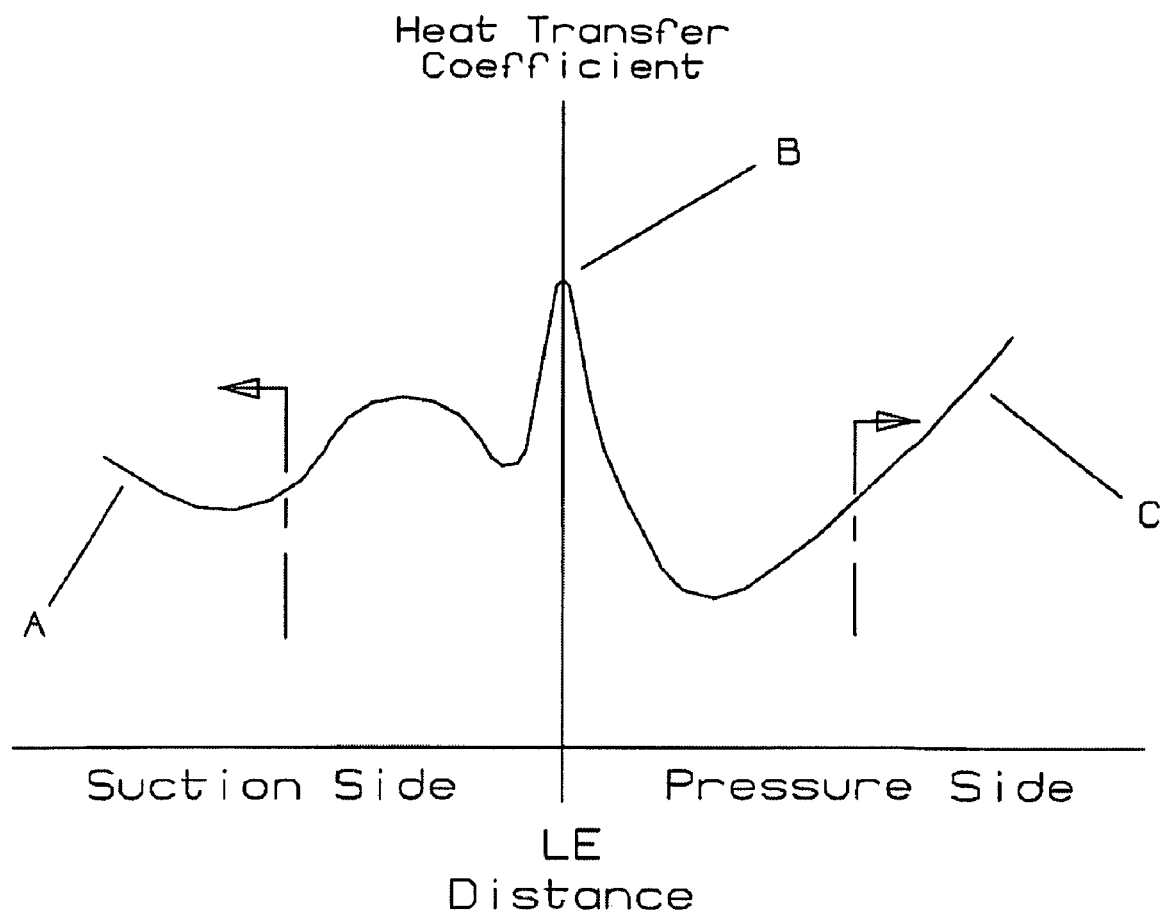
FIG. 1 shows a graph of a blade external heat transfer coefficient for a prior art first stage rotor blade.
Figure 2:
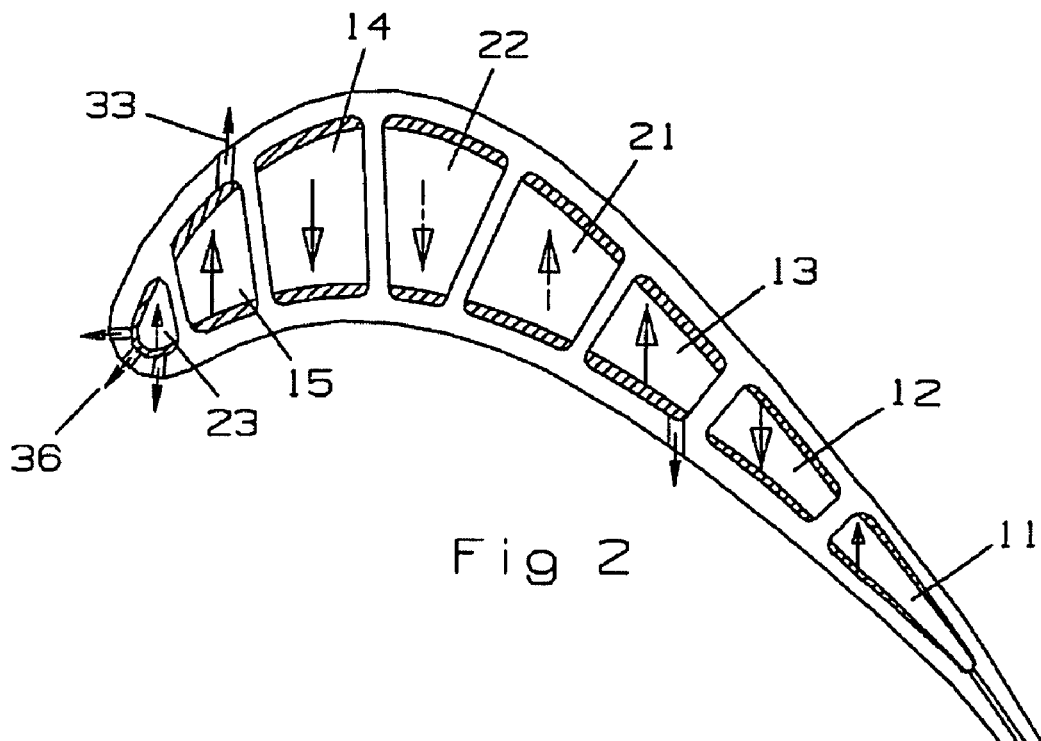
FIG. 2 shows a cross section top view of the serpentine flow cooling circuit of the present invention.

The present invention is a turbine rotor blade for use in a first stage turbine of an industrial gas turbine (IGT) engine. However, the cooling circuit can be used for other than the first stage of the turbine, and can also be used in an aero engine. FIG. 2 shows a cut-away cross section from the top of the turbine rotor blade with the serpentine flow cooling circuit of the present invention. The blade includes a leading edge and a trailing edge with the pressure side and suction side walls extending between the two edges. The leading edge includes a showerhead arrangement of film cooling holes 36 to provide a layer of film cooling air onto the external surface of the leading edge. The trailing edge region includes a row of cooling air exit holes 31 to provide cooling for this section of the airfoil. The blade also includes channels or passages that extend from the platform to the root with each channel extending across from the pressure side wall to the suction side wall.

The cooling circuit of the present invention includes a first forward flowing serpentine flow cooling circuit that includes a first leg 11 arranged adjacent to the trailing edge region and forms the supply channel for the first serpentine flow cooling circuit. The first leg 11 flows toward the blade tip and then turns 180 degrees and flow into the second leg 12 and then turns again at the platform section and into the third leg 13. The tip turn from the first leg 11 to the second leg 12 includes one or more discharge cooling holes 32 to discharge cooling air out the suction side wall surface at the blade tip just below the blade tip edge.

The first serpentine flow cooling circuit also includes a fourth leg 14 and a fifth leg 15 that flows toward the blade tip. The turn from the third leg 13 to the fourth leg 14 also includes suction side wall discharge cooling holes 32 that open onto the suction side wall of the blade tip. The fifth leg 15 also can include a row of film cooling holes 33 on the suction side wall to provide film cooling for this part of the external airfoil surface. The fifth leg of the 5-pass serpentine flow circuit ends just below the blade tip cooling channel 35 so that all of the cooling air flow through the fifth leg 15 is discharged through the row of suction side film cooling holes 33.

Figure 3:
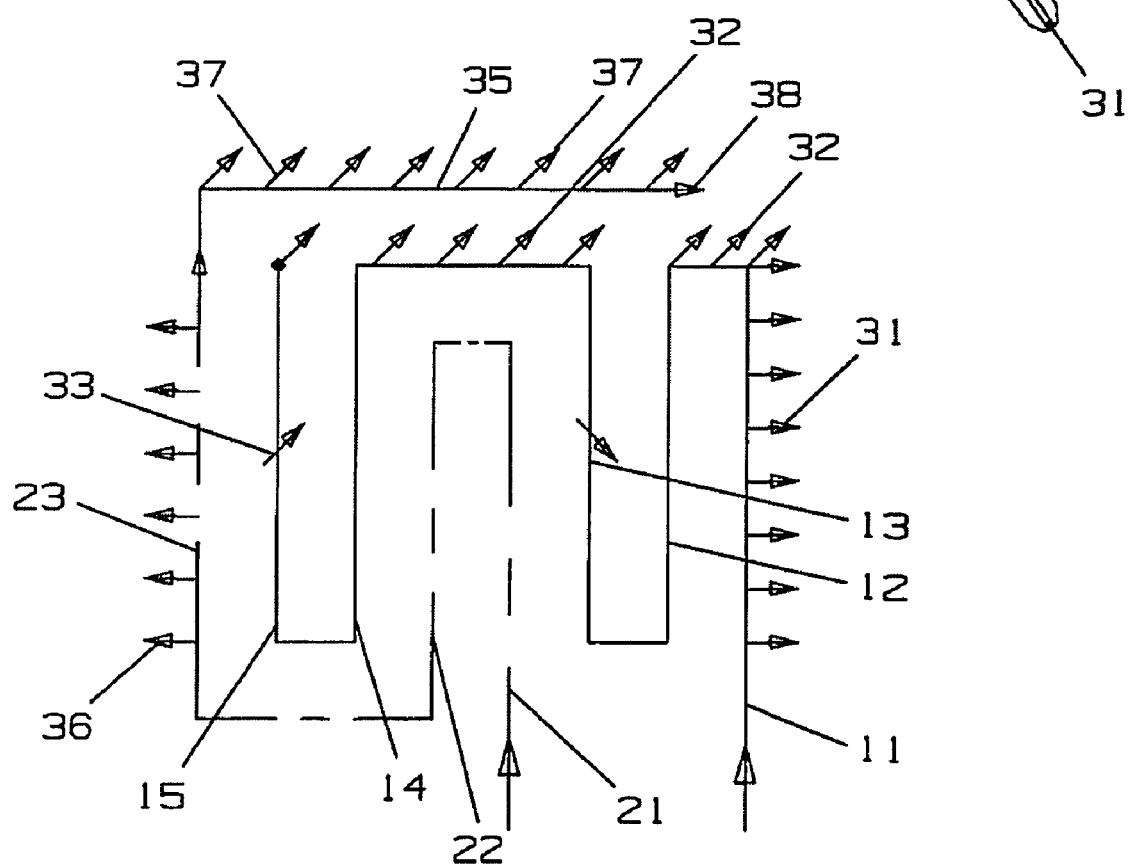
FIG. 3 shows a flow diagram for the serpentine flow cooling circuit of the present invention.

The cooling circuit of the present invention also includes a second forward flowing serpentine flow cooling circuit with a first leg or channel 21 located in the airfoil mid-chord region and between the third leg 13 and fourth leg 14 of the first serpentine flow cooling circuit. The first leg 21 is also the cooling air supply leg or channel for the second serpentine flow cooling circuit and is connected to the same blade external cooling air source such as the compressor. The second serpentine flow cooling circuit also includes a second leg 22 and a third leg 13 as shown in the FIG. 3 flow diagram. The third leg 23 is located along the leading edge and is connected to the showerhead arrangement of film cooling holes 36 to provide the cooling air for these holes 36. The third leg 23 of the second serpentine circuit is also connected to a blade tip cooling passage 35 formed within the blade tip to provide cooling for the blade tip. Tip cooling holes 37 are also connected to the passage 35 to discharge cooling air for use in the tip region. A tip exit cooling hole 38 discharges the cooling air from the tip passage 35 at the trailing edge region.

In the cooling circuit of the present invention, the forward flowing 5-pass serpentine cooling flow circuit is used for the blade trailing edge and main body cooling flow circuits. Cooling air for the 5-pass forward flowing serpentine circuit is fed through the blade trailing edge section and then flows forward toward the leading edge. Cooling air is bled off from the first leg 11 and is discharges through the trailing edge exit cooling holes 31 to provide cooling for the blade trailing edge corner. The remaining cooling air is then channeled through the serpentine flow channels 12-15 and is finally discharged on the airfoil suction side to form a film cooling layer for the cooling of the airfoil suction side heat load region. Some of the cooling air flowing through the 5-pass serpentine flow circuit is bled off through cooling holes arranged along the suction side wall just below the blade tip cooling channel through the cooling holes 32 in the two tip turns between the first and second legs 11 and 12 and between the third and fourth legs 13 and 14 as represented by the arrows 32 in FIG. 3. The remaining cooling air flows out through the row of suction side film cooling holes 33 in the fifth leg 15. This counter-flow cooling flow arrangement enables the use of fresh cooling air for the blade trailing edge and aft section first prior to being discharged from the 5-pass serpentine flow circuit for film cooling purposes.

Figure 4:
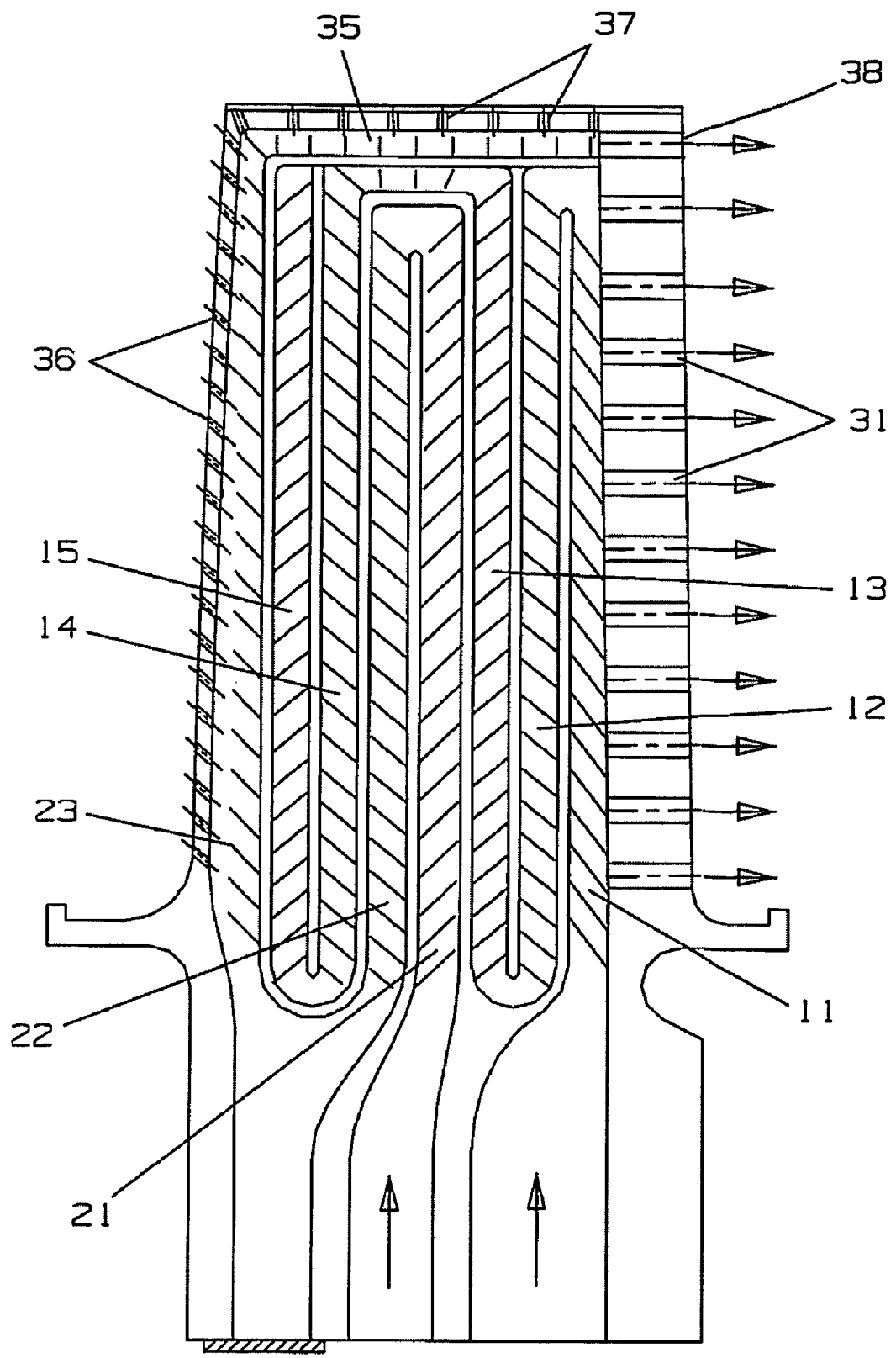
FIG. 4 shows a cross section side view of the serpentine flow cooling circuit of the present invention.

For the second forward flowing serpentine flow circuit that includes the blade tip section cooling circuit, cooling air is fed through the blade mid-chord section and channels toward the blade leading edge. FIG. 4 shows a cross section side view of the two serpentine flow circuits in the airfoil and the blade tip cooling channel. A showerhead arrangement of film cooling holes is used to provide film cooling for the leading edge surface. However, due to the low cooling flow consumption, backside impingement cooling for the airfoil leading edge region cannot be implemented in the 3-pass serpentine cooling flow circuit. A portion of the cooling flow is discharged at the blade leading edge through the showerhead film holes to form a film cooling layer for the cooling of the blade leading edge where the heat load is the highest on the entire airfoil. The last leg 23 of the 3-pass serpentine circuit is then connected to the tip section cooling channel with film cooling. For the blade tip section cooling channel, the tip section film cooling is achieved by bleed off cooling air from the turns of the 5-Pass serpentine flow circuit. A majority of the total cooling air flow is discharged through the pressure side film cooling holes upstream of the airfoil trailing edge to provide film cooling for the airfoil trailing edge corner. Micro pin fins can be used in the tip section cooling flow channel to enhance the channel convection and conduction cooling performance.

Major design features and advantages of the cooling circuit of the present invention over the prior art 5-pass forward flowing serpentine circuit are listed below. The back flow margin issue is minimized. The cooling air for the 5-pass serpentine flow circuit is fed through the airfoil trailing edge section first and then flows toward the airfoil leading edge to form a counter flow cooling arrangement which will maximize the use of the cooling air potential. A higher cooling mass flow through the airfoil main body is achieved which yields a lower mass average blade metal temperature to translate into a longer stress rupture life for the blade. Cooling air for the 3-pass serpentine flow circuit is fed through the airfoil mid-chord section where the external gas side heat load is low. Since the cooling air temperature is fresh, a maximum use of cooling air potential is available to, achieve a non-film cooling zone for the airfoil. The elimination of the leading edge pressure side film cooling is thus possible. The forward flowing 5-pass serpentine flow cooling circuit will maximize the use of cooling air and provide a very high overall cooling efficiency for the entire airfoil, especially for the suction side downstream of the blade leading edge. Film cooling air is channeled through the entire 5-pass serpentine flow circuit and is then used as film cooling air for the blade suction side surface. The forward flowing serpentine cooling flow circuit with blade tip section cooling flow used for the airfoil main body will maximize the use of cooling air potential. Majority of the air for the tip channel is discharged at the aft section of the airfoil where the gas side pressure is low and thus yield a high cooling air to main stream pressure potential to be used for the serpentine channels and maximize the internal cooling performance for the serpentine as well as for the tip cooling channel. The forward flowing main body 5-pass serpentine flow channel with discharge flow on the suction side of the blade where the gas side pressure is relatively low. This cooling flow design yields a lower cooling supply pressure requirement and lower leakage. Elimination of serpentine root turn geometry constraint which improves the casting yield for the 3-pass serpentine flow circuit. Open root turn design improves serpentine turn loss and increases cooling flow addition design flexibility. The 5-pass with 3-pass serpentine flow cooling design for the forward section of the blade yields a lower and more uniform blade sectional mass average temperature which improves the blade creep life capability. The dedicated trailing edge cooling circuit provides a cooler cooling air for the blade root section and thus improves the airfoil high cycle fatigue (HCF) capability. The current 5+3 serpentine flow cooling circuit provides greater cooling design flexibility for the airfoil. Individual cooling flow channels can be addressed for the airfoil heat loads on a separate basis. The 5-pass serpentine flow circuit is designed for cooling the blade trailing edge and suction side section. The 3-pass serpentine flow circuit is designed for the blade leading edge cooling and tip section cooling. These tow circuits will maximize the airfoil oxidation capability and allow for a higher operating temperature for future engine upgrades.

I claim the following:

1. An air cooled turbine rotor blade comprising:
   a leading edge region with a showerhead arrangement of film cooling holes;
   a trailing edge region with a row of exit cooling holes;
   a first forward flowing serpentine flow cooling circuit having a first leg located adjacent to the trailing edge region to supply cooling air to the row of exit cooling holes;
   a second forward flowing serpentine flow cooling circuit having a first and second leg positioned between the first leg and the last leg of the first forward flowing serpentine flow cooling circuit; and,
   the second forward flowing serpentine flow cooling circuit having a last leg located adjacent to the leading edge region to supply cooling air to the showerhead arrangement of film cooling holes.

2. The air cooled turbine rotor blade of claim 1, and further comprising:
   the first forward flowing serpentine flow cooling circuit is a 5-pass serpentine circuit.

3. The air cooled turbine rotor blade of claim 1, and further comprising:
   the first and second serpentine flow circuits both extend from the platform region of the airfoil to the blade tip region.

4. The air cooled turbine rotor blade of claim 2, and further comprising:
   the first and second legs of the second serpentine flow circuit are both located between the third and fourth legs of the first serpentine flow circuit.

5. The air cooled turbine rotor blade of claim 1, and further comprising:
   a blade tip cooling passage extending from the leading edge region of the blade tip to the trailing edge region of the blade tip;
   the last leg of the second serpentine flow circuit being connected to the inlet of the blade tip cooling passage.

6. The air cooled turbine rotor blade of claim 5, and further comprising:
   a plurality of blade tip cooling holes extending along substantially all of the blade tip and connected to the blade tip cooling passage.

7. The air cooled turbine rotor blade of claim 1, and further comprising:
   tip turns of the first forward flowing serpentine flow cooling circuit are connected to suction side wall cooling holes opening underneath the tip cooling channel.

8. The air cooled turbine rotor blade of claim 1, and further comprising:
   the first and second forward flowing serpentine flow cooling circuits both include channels that extend from the pressure side wall to the suction side wall.

9. The air cooled turbine rotor blade of claim 2, and further comprising:
   the fifth leg of the first forward flowing serpentine flow cooling circuit is connected to a row of film cooling holes that discharge onto the suction side wall of the airfoil.

10. The air cooled turbine rotor blade of claim 2, and further comprising:
    the third leg of the first forward flowing serpentine flow cooling circuit is connected to a row of film cooling holes that discharge onto the pressure side wall of the airfoil.

11. The air cooled turbine rotor blade of claim 8, and further comprising:
    the first and second forward flowing serpentine flow cooling circuits both include channels with trip strips along the channels.

12. The air cooled turbine rotor blade of claim 1, and further comprising:
    the leading edge region of the blade is without an impingement cavity and impingement cooling holes.

13. The air cooled turbine rotor blade of claim 1, and further comprising:
    the blade is a low cooling flow first stage blade for an industrial gas turbine engine.

14. The air cooled turbine rotor blade of claim 1, and further comprising:
    the trailing edge region of the blade is without an impingement cavity and impingement cooling holes.

* * * * *